United States Patent [19]
Kasai

[11] Patent Number: 5,388,246
[45] Date of Patent: Feb. 7, 1995

[54] ARRANGEMENT AND METHOD OF CONTROLLING MEMORY ACCESS REQUESTS IN DIGITAL DATA PROCESSING SYSTEM

[75] Inventor: Hiroyuki Kasai, Yamanashi, Japan

[73] Assignee: NEC Corporation, Tokyo, Japan

[21] Appl. No.: 136,999

[22] Filed: Oct. 18, 1993

Related U.S. Application Data

[63] Continuation of Ser. No. 589,650, Sep. 28, 1990, abandoned.

[30] Foreign Application Priority Data

Sep. 28, 1989 [JP] Japan .................................. 1-253384

[51] Int. Cl.[6] ............................................. G06F 13/00
[52] U.S. Cl. .................................. 395/425; 364/239.6;
364/244.3; 364/284.1; 364/284.2; 364/926.1;
364/926.93; 364/939.3; 364/DIG. 1
[58] Field of Search ......................................... 395/425;
364/200 MS File, 900 MS File, 239.6, 244.3,
246.2, 926.1, 926.93, 939.3, 965.8, 284.2, 284.1

[56] References Cited

U.S. PATENT DOCUMENTS

| | | | |
|---|---|---|---|
| 4,207,609 | 6/1980 | Luiz et al. | 395/325 |
| 4,480,307 | 10/1984 | Budde et al. | 395/325 |
| 4,912,632 | 3/1990 | Gach et al. | 364/200 |
| 4,999,769 | 3/1991 | Costes et al. | 395/550 |
| 5,006,982 | 4/1991 | Ebersole et al. | 395/325 |
| 5,050,066 | 9/1991 | Myers et al. | 395/575 |
| 5,136,584 | 8/1992 | Hedlund | 370/94.1 |
| 5,195,089 | 3/1993 | Sindhu et al. | 370/85.1 |

Primary Examiner—Joseph L. Dixon
Assistant Examiner—Frank J. Asta
Attorney, Agent, or Firm—Foley & Lardner

[57] ABSTRACT

Before a memory access request is applied to a memory, a request receive signal is generated and applied to a controller. The controller retrieves information from a request information buffer having a limited memory space. The information is to be returned to a unit which has issued the request and is stored in a reply buffer. The transfer of the information into the reply buffers induces the acceptance of a new request before the completion of the actual access to the memory.

3 Claims, 4 Drawing Sheets

ARRANGEMENT AND METHOD OF CONTROLLING MEMORY ACCESS REQUESTS IN DIGITAL DATA PROCESSING SYSTEM

This application is a continuation of application Ser. No. 07/589,650, filed Sep. 28, 1990, now abandoned.

BACKGROUND OF THE INVENTION

1. Field of the Invention

The present invention relates to an arrangement and method of controlling memory access requests in digital data processing system. The memory access requests are issued from a central processing unit (CPU) (for example) operating under clocks which are different from those under which a main memory operates. The present invention enables an effective reduction in the waiting time of main memory access requests in the event of successive occurrences thereof.

2. Description of the Prior Art

In order to effectively increase the over-all performance of a digital processing system which includes high-speed units such as a CPU and input/output device controllers which operate under clocks faster than those under which a main memory operates, it is a known practice to provide a memory access request controller between the high-speed units and the main memory.

Throughout the instant specification, the faster and slower clocks in the system are respectively denoted by first and second clocks. The first clocks synchronize the high-speed units while the second clocks synchronize the operation of the main memory. Further, instructions and information which are not directly concerned with the present invention will not be referred to for brevity.

The memory access controller comprises two portions: the first portion is coupled to the high-speed units and operates under the first clocks, while the second portion is coupled to the main memory and operates under the second clocks. When a high-speed unit issues a main memory access request, the memory access controller stores memory access request information, which is accompanied by the access request, in a buffer and initiates an access to the main memory.

However, in the event that the memory access requests are successively generated and exceed the capacity of the buffer, the memory access controller refuses the receipt of a new request until the access controller receives an access reply from the main memory. This induces an undesirably long wait and is disadvantageous from an over-all system performance point of view.

The above-mentioned prior art will further be discussed with reference to FIGS. 1 and 2.

The arrangement shown in block diagram form in FIG. 1, comprises a memory access controller 10 which is interconnected between a main memory 12 and units which issue memory access requests. The units, which request memory access, include a CPU 14 and a plurality of input/output (I/O) device controllers 16a and 16b. The memory access controller 10 comprises first and second portions 18 and 20. The first portion 18 includes a plurality of units all of which operate under the first clocks, while the second portion 20 includes units operating under the second clocks.

In more detail, the first portion 18 comprises a memory access request information buffer controller 22, a memory access request information buffer 24, a counter 26, a reply controller 28 and a clock synchronizer 30.

On the other hand, the second portion 20 comprises a memory access request receive register 32, a memory access request information read-out circuit 34, a clock synchronizer 36 and a reply receive register 38.

The I/O device controllers 16a and 16b are respectively, operatively coupled with I/O devices 40a–40n and 41a–41n which function under third clocks which are much slower than either of the first and second clocks.

It is assumed that the buffer 24 can store up to 16 words each of which is able to store one item of memory access request information. Each of the blocks 14, 16a and 16b, issues a memory access request which accompanies memory access request information. The access request information includes a main memory address to be accessed, a read/write instruction, and reply data or information which are held in the buffer 24 and not used to access the memory 12. Merely by way of example, the reply information is data which specifies an I/O device (40a, ..., 40n, 41a, ..., 41n) which has sent a memory access request to the corresponding I/O device controller (16a or 16b in this case). Although the CPU 14 also supplies reply information, the details thereof will be omitted for brevity. The reply information should be fed back to the request sender. It should be noted that the I/O devices are not dealt with as request senders. The I/O device controllers 16a and 16b are treated as such in the instant specification.

In the event that the I/O control circuit 16a (for example) issues a memory access request which accompanies access request information, the buffer controller 22 is responsive to the access request and stores the access request information in the buffer 24. It should be noted that the buffer controller 22 is able to specify the unit (16a, 16b or 18 in this case) which issues the memory access request. The information specifying a request sender is also stored in the buffer 24. The access request information stored in the buffer 24 are: (a) a memory address to be accessed, (b) a read/write instruction, (c) reply information, and (d) information determining which unit has issued the memory access request.

The buffer controller 22, upon receipt of a memory access request, applies it to the access request receive register 32 via the clock synchronizer 36, and counts up the counter 26. The content of the counter 26 corresponds to the number of access request information stored in the buffer 24. When the register 32 receives the memory access request, it feeds an instruction signal to the access request information read-out circuit 34. This circuit 34, in response to the signal applied thereto, applies a read-out signal to the buffer controller 22, whereby the corresponding memory access request information is read out from the buffer 24 and is applied to the request receive register 32 via the clock synchronizer 36. Thereafter, the memory access request information is applied from the register 32 to the main memory 12 which performs a read/write operation according to the access request information. As mentioned above, the reply information is not sent to the request receive register 32.

It should be noted that the main memory 12 stores and outputs data through a data bus 13. These data read/write operations are not concerned with the present invention and hence further descriptions thereof will be omitted for brevity.

The main memory 12 supplies the reply receive register 38 with memory reply data which includes two signals, one of which (first signal) indicates the unit which has issued the memory access request while the other (second signal) indicates whether or not memory access request has been performed. The memory reply data is then applied, via the clock synchronizer 30, to the reply controller 28. The controller 28, upon receipt of the memory reply data, applies the second signal to the buffer 24 in accordance with the first signal which specifies the location of the access request information within the buffer 24. Then, the buffer 24 applies the second signal plus the reply information to the unit (14, 16a or 16b) which has requested the memory access. The reply information has been stored in the buffer 24 as referred to previously.

On the other hand, the reply controller 28 counts down the counter 26, which in turn informs the buffer controller 22 that one memory access request has been completed. In the event that the buffer 24 stores up to the memory capacity thereof (viz., 16 request information in this case), the buffer controller 22 is able to accept a new memory access request in response to a signal applied from the counter 26. Since the buffer controller 22 deals with the memory access requests in the order of receipt, it is able to specify which memory portion of the buffer 24 is ready to store the next new request information.

The difficulty encountered in the above-mentioned prior art will further be discussed with reference to FIGS. 1 and 2.

It is assumed that the buffer controller 22 successively receives 16 memory access requests (a-1, b-1, c-1, ..., p-1) from one or more of the CPU 14 and the circuits 16a, 16b. As mentioned previously, the buffer 24 is able to store 16 items of access request information and hence the controller 22 refuses receipt of the 17th request q-1. Upon the buffer controller 22 receiving the first request a-1, the controller 22 applies an access request a-2 to the request receive register 32. Further, the controller 22 induces the buffer 24 to store the memory access information which is accompanied by the access request a-1. Similar operations are performed on each of the other access requests.

The request information read-out circuit 34, in response to the request a-2 applied to the request receive register 32 starts to retrieve the corresponding access request information which has been stored in the buffer 24. Thus, the access request information, corresponding to the request a-1, is applied to and stored in the request receive register 32 and then fed to the main memory 12 as a signal a-3. After the memory 12 has completed the operation required by the request a-1, the memory 12 applies a memory reply information a-4 to the reply receive register 38, which in turn applies the memory reply data (equal to a-4 but denoted by a-5) to the reply controller 28. Thereafter, the buffer 24 applies the reply information stored in the buffer 24 plus the above-mentioned second signal (denoted by a-6 in FIG. 2) to the unit which has issued the request a-1 and which is advised that the buffer controller 22 is now ready for receipt of a new request q-1. The buffer controller 22, however, is in fact able to accept the 17th request immediately after the generation of the signal a-6 at time T3.

In FIG. 2, Ta represents a time period between time points T1 and T2 while Tb denotes a time period between time points T1 to T3. It is understood that during a time period between T2 and T3 ($\approx$ Tb-Ta) the buffer controller 22 is unable to accept a new request.

If the memory capacity of the buffer 24 is increased, this problem may be solved. However, this approach will encounter another difficulty in that the volume of hardware is undesirably increased.

SUMMARY OF THE INVENTION

It is an object of the present invention to provide an arrangement of controlling memory access requests which markedly reduces the memory access request waiting time without an attendant increase in the amount of hardware.

Another object of the present invention is to provide a method of controlling memory access requests which markedly reduces the memory access request waiting time without an attendant increase in the amount of hardware.

In brief, the above objects are achieved by an arrangement which, before memory access request is applied to a memory, generates a request receive signal and applies same to a reply controller. The reply controller retrieves reply information from a request information buffer having a limited memory space and transfers it into a reply buffer. The reply information is to be returned to a unit which has issued the request. The transfer of the reply information into the reply buffer induces the acceptance of a new request before the completion of the actual access to the memory.

More specifically a first aspect of the present invention resides in a memory access request controller which is provided between a plurality of memory access requesting units and a main memory, the plurality of memory access requesting units functioning under first clocks while the main memory operates under second clocks, the memory access request controller including a buffer which stores memory access request information and reply information both of which are applied from at least one of the memory access requesting units, the memory access request controller further comprising: first means, the first means operating under the first clocks and controlling read/write operations of the buffer; second means, the second means operating under the second clocks and coupled to the main memory, the second means retrieving the memory access request information from the buffer and generating an access request receive signal; and third means, the third means coupled to the buffer and the first means, the third means functioning under the first clocks and retrieving the reply information stored in the buffer in response to the access request receive signal, the third means inducing the first means to accept memory access information in response to the access request receive signal.

A second aspect of the present invention comes in a method of controlling memory access requests using a controller which is provided between a plurality of memory access requesting units and a main memory, the plurality of memory access requesting units functioning under first clocks while the main memory operates under second clocks, the memory access request controller including a buffer which stores memory access request information and reply information both of which are applied from at least one of the memory access requesting units, the method comprising the steps of: (a) storing the memory access information under the first clocks; (b) retrieving the memory access request information from the buffer under the second clocks and generating an access request receive signal; and (c) retrieving the reply information stored in the buffer under the first clocks in response to the access request receive signal, and inducing the acceptance of a memory access information in response to the access request receive signal.

BRIEF DESCRIPTION OF THE DRAWINGS

The features and advantages of the present invention will become more clearly appreciated from the following description taken in conjunction with the accompanying drawings in which like elements are denoted by like reference numerals and in which.

DETAILED DESCRIPTION OF THE PREFERRED EMBODIMENTS

A preferred embodiment of this invention will be discussed with reference to FIGS. 3 and 4.

Figure 1:
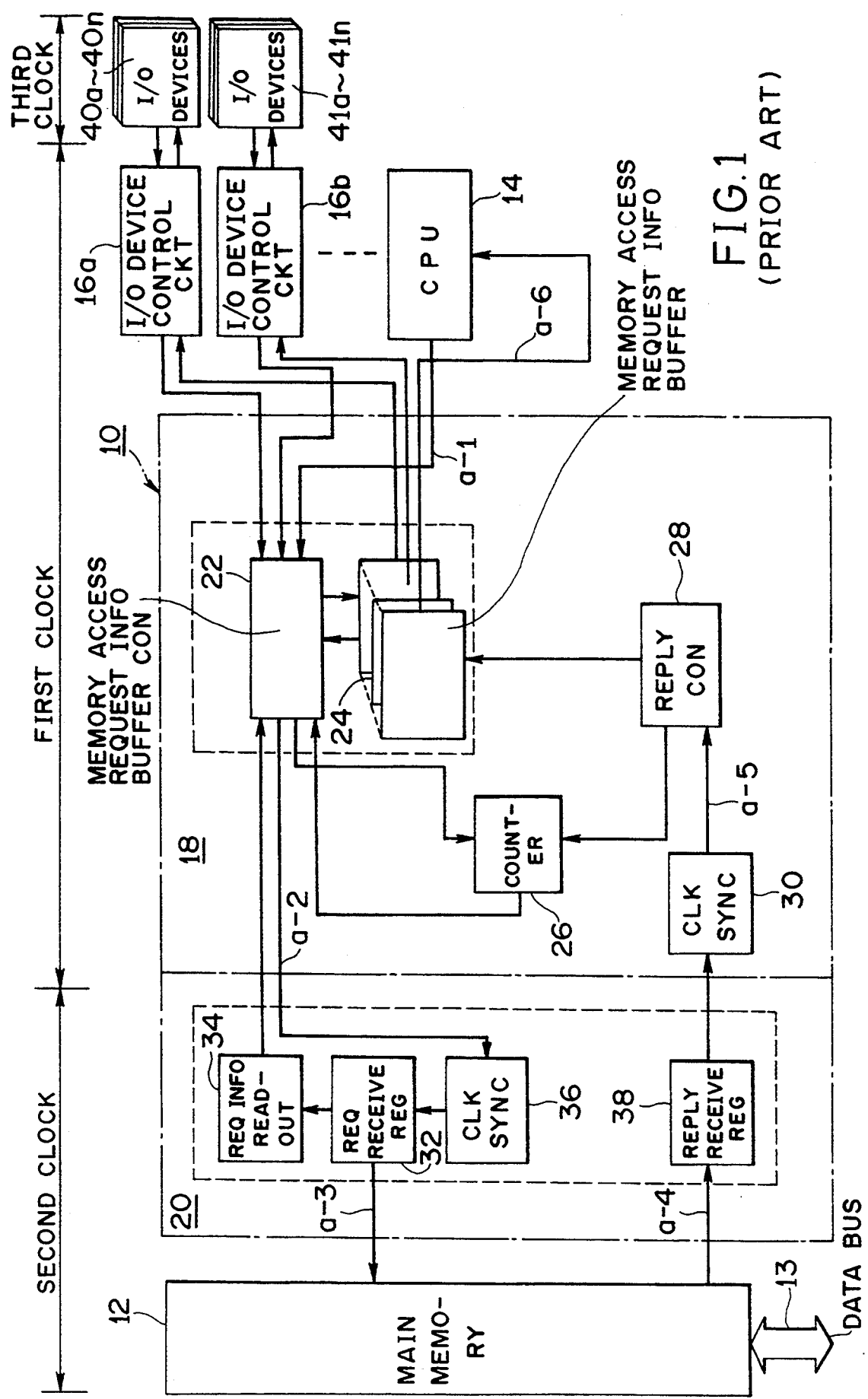
FIG. 1 is a block diagram illustrating the known main memory request control arrangement together with a main memory and units which issue memory access requests, which was referred to in the opening paragraphs of the instant specification.
Figure 2:
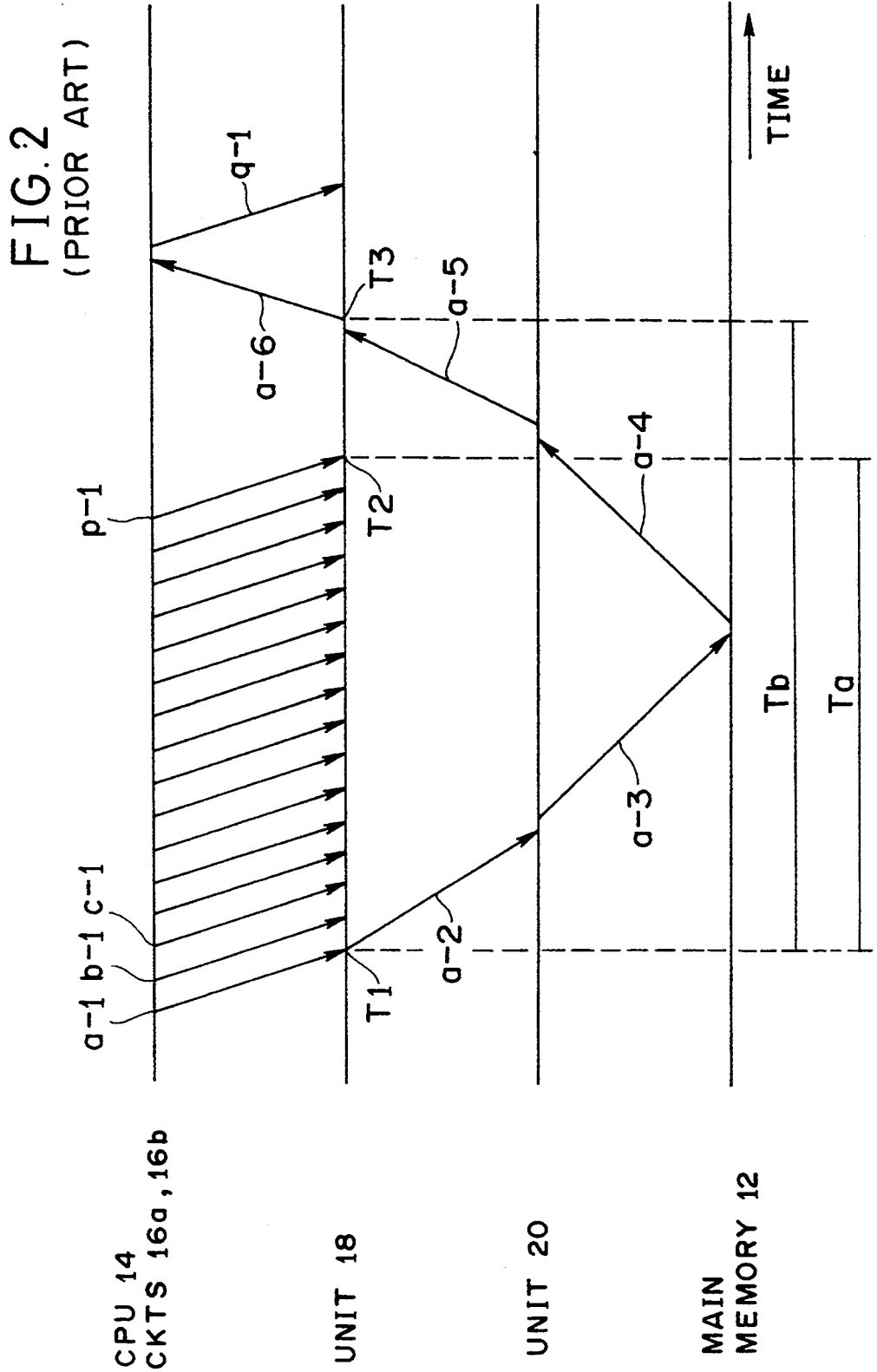
FIG. 2 is a timing chart which depicts the operation of the prior art discussed in the opening paragraphs of the instant disclosure in connection with FIG. 1.
Figure 3:
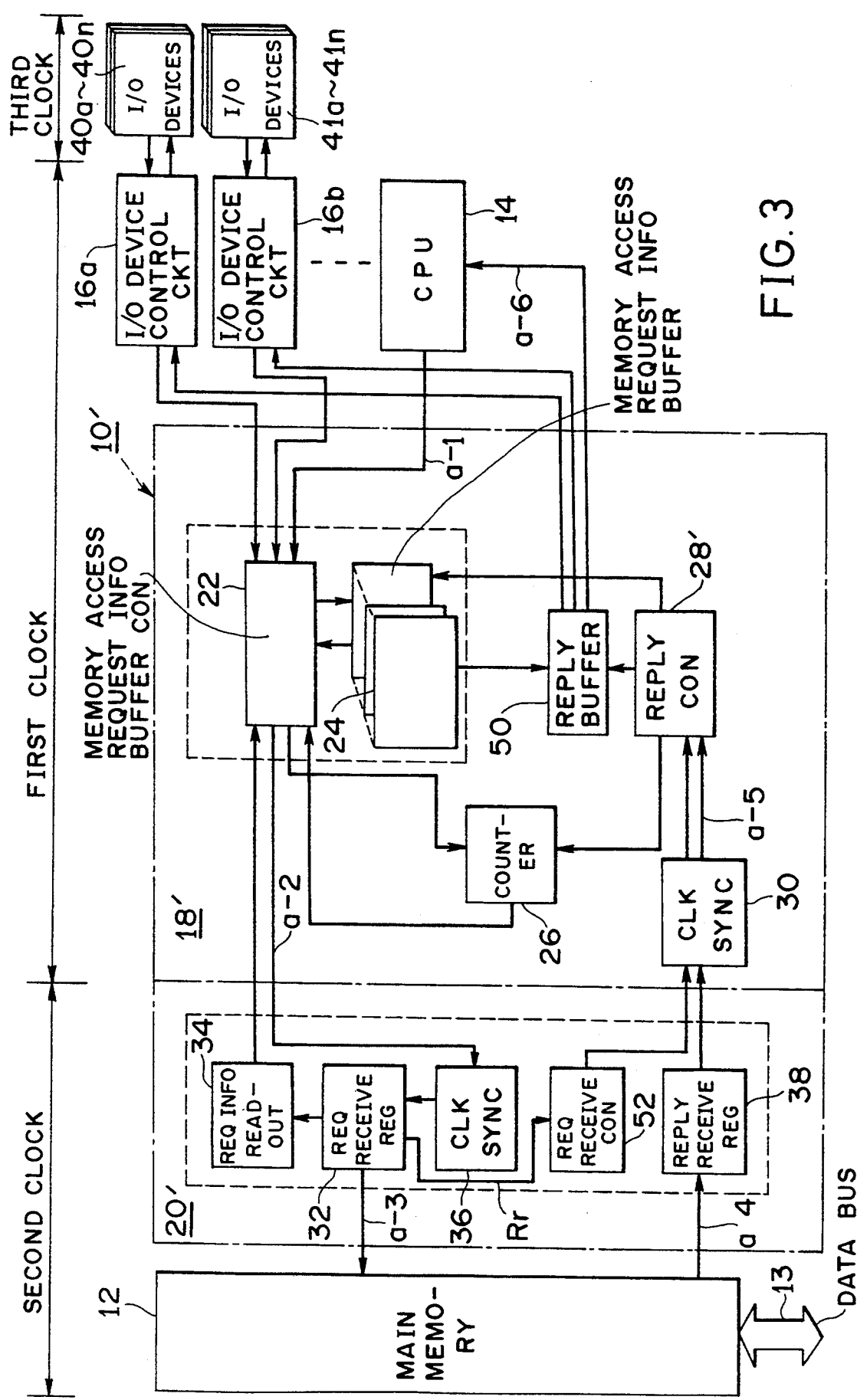
FIG. 3 is a block diagram illustrating a main memory request control arrangement according to the present invention together with a main memory and units issuing memory access requests.

The arrangement shown in FIG. 3 differs from that shown in FIG. 1 in that: (a) the FIG. 3 arrangement further includes a reply buffer 50 and a request receive controller 52, (b) a reply controller 28' (which is a modification of the controller 28) is further coupled to the reply buffer 50 and (c) the CPU and the I/O device control circuits 16a, 16b are supplied with the reply information and the memory reply data from the reply buffer 50. The remaining portions of the FIG. 3 arrangement are identical with the FIG. 1 arrangement, counterparts being depicted by like numerals. A redundant description is omitted for brevity.

When the memory access request register 32 receives the memory access signal a-2, the register 32 supplies the request receive controller 52 with information Rr which includes information indicating which unit has issued the request a-1. This information corresponds to the first signal referred to in connection with the prior art. The controller 52, in response to the information Rr, applies a request receive signal A-1 to the reply controller 28'. The signal A-1 also includes the information which indicates the unit issuing the request. In response to the signal A-1, the reply controller 28' transfers the corresponding reply information from the request buffer 24 to the reply buffer 50. Simultaneously, the reply controller 28' counts down the counter 26 which in turn advises the buffer controller 22 that a new memory access request is acceptable even if the buffer 24 has stored up to the limit thereof just before the reply controller 28' receives the signal A-1. More specifically, from the time point (T4 in FIG. 4) when the buffer controller 22 has transferred the reply information within the request information buffer 24 to the reply buffer 50 and received the signal from the counter 26, the controller 22 is ready to receive a new request. It should be noted that the counter 26 is reset prior to the request receive operations at the buffer controller 22.

When the reply controller 28' is supplied with the memory reply data a-5, the controller 28' supplies the reply buffer 50 with the second signal (viz., one indicating whether or not the memory access request has been performed) in accordance with the first signal (viz., one indicating the unit which has issued the request). Then, the reply buffer 50 applies the reply information plus the second signal to the unit which has requested the memory access.

Figure 4:
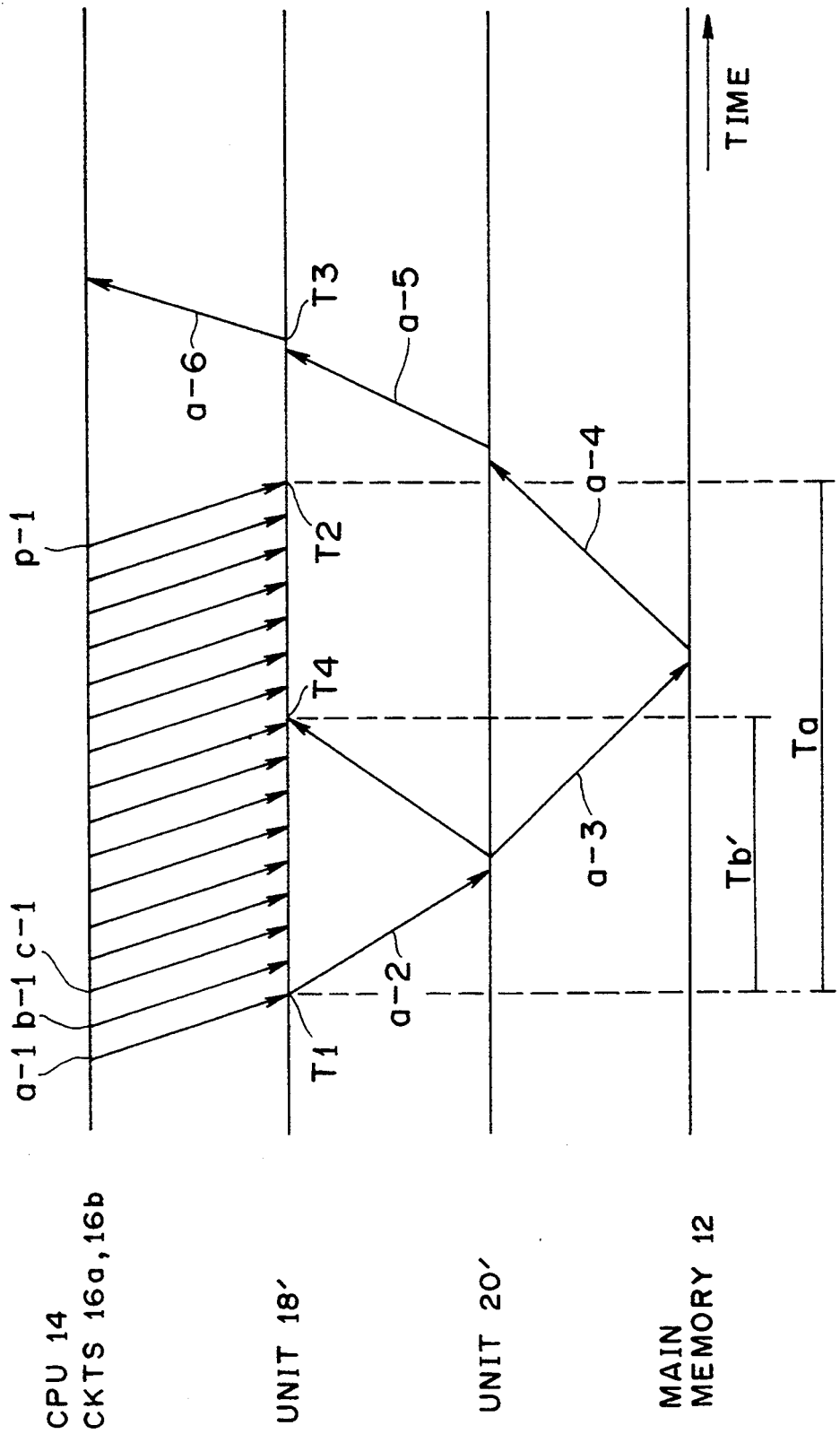
FIG. 4 is a timing chart which depicts the operation of the FIG. 3 arrangement.

As clearly seen from FIG. 4, according to the present invention, the time period Tb of the prior art can be remarkably reduced to Tb' which is defined between time points T1 and T4.

According to the above description, the control signal Rr is generated from the register 32 when the memory access request register 32 receives the memory access signal a-2. As an alternative, the register 32 may be arranged to output the signal Rr when the register 32 has received the memory access information after receiving the access signal a-2.

While the foregoing description describes one embodiment according to the present invention, the various alternatives and modifications possible without departing from the scope of the present invention, which is limited only by the appended claims, will be apparent to those skilled in the art.

What is claimed is:

1. A memory access request controller which is provided between a plurality of I/O device controllers and a main memory, said plurality of I/0 device controllers operating under first clocks while said main memory operating under second clocks, said memory access request controller including a buffer which stores memory access request information which includes memory access data and request issued I/O device controller information and request ordered I/O device information, said memory access request information being applied from at least one of said I/0 device controllers, said memory access request controller further comprising:

first means, operating under said first clocks, for controlling read/write operations of said buffer;

second means, operating under said second clocks and coupled to said first means and said main memory, for receiving said memory access data and said request issued I/O device controller information from said buffer and for generating access request receive information including said request issued I/O device controller information; and third means, coupled to said buffer and said first means and said second means and operating under said first clocks for inducing said first means to transfer said request ordered I/O device information stored in said buffer into said third means in response to said access request receive information received from said second means.

2. A memory access request controller as claimed in claim 1 wherein said third means comprises:

a reply controller coupled to said second means for receiving said access request receive information and generating a signal in response thereto;

a reply buffer coupled to said buffer and said reply controller for storing said request ordered I/O device information; and a counter, provided between said first means and said reply controller, for counting up each time said first means stores said memory access request information in said buffer and for counting down in response to said signal generated by said reply controller in response to said access request receive information.

3. A method of controlling memory access requests using a controller which is provided between a plurality of I/O device controllers and a main memory, said plurality of I/O device controllers operating under first clocks while said main memory operating under second clocks, said controller including a buffer which stores memory access request information which includes memory access data and request issued I/O device controller information and request ordered I/O device information, said memory access request information being applied from at least one of said I/O device controllers, said method comprising the steps of:

(a) storing said memory access request information in said buffer under operation of said first clocks;

(b) receiving said memory access data and said request issued I/O device controller information from said buffer under operation of said second clocks and generating access request receive information including said request issued I/O device controller information under operation of said second clocks; and (c) inducing storage of said request ordered I/O device information stored in said buffer in response to said access request receive information under operation of said first clocks.

* * * * *